United States Patent [19]
Pfeifer

[11] Patent Number: 5,314,382
[45] Date of Patent: May 24, 1994

[54] TORQUE-TRANSMITTING COUPLING MEMBER

[75] Inventor: Peter Pfeifer, Salzburg, Austria

[73] Assignee: Geislinger & Co. Schwingungstechnik Gesellschaft m.b.H., Salzburg, Austria

[21] Appl. No.: 937,963

[22] Filed: Aug. 28, 1992

[30] Foreign Application Priority Data

Sep. 24, 1991 [AT] Austria .............................. A 1920/91

[51] Int. Cl.⁵ ............................................... F16C 3/00
[52] U.S. Cl. ..................................... 464/181; 464/183
[58] Field of Search ...................... 464/87, 98, 99, 181, 464/182, 147, 183; 138/109; 285/405, 915; 156/293, 294; 428/36.4, 36.9, 36.92

[56] References Cited

U.S. PATENT DOCUMENTS

| | | | |
|---|---|---|---|
| 3,651,661 | 3/1972 | Darrow | 464/181 |
| 4,335,587 | 6/1982 | Thomamueller et al. | 464/181 X |
| 4,681,556 | 7/1987 | Palmer | 464/183 X |
| 4,706,364 | 11/1987 | Aubry | 464/181 X |
| 4,758,204 | 7/1988 | Lindgren | 464/183 |
| 4,848,801 | 7/1989 | Grabonski | 156/294 X |
| 4,931,119 | 6/1990 | Watkins | 156/293 X |

FOREIGN PATENT DOCUMENTS

0413677A1  7/1990  European Pat. Off. .
2422181  11/1975  Fed. Rep. of Germany .

*Primary Examiner*—Daniel P. Stodola
*Assistant Examiner*—Eileen Dunn
*Attorney, Agent, or Firm*—Collard & Roe

[57] ABSTRACT

A coupling member for incorporation in a torque-transmitting drive train comprises a tube and at least one flange at at least one end of the tube. The tube and flange consist of fiber-reinforced plastic. In order to permit a simpler manufacture and an improved selection of strength and load-carrying properties in adaptation to different conditions of use, the tube and the flange are separately prefabricated and are adhesively joined to and by a sleeve.

4 Claims, 1 Drawing Sheet

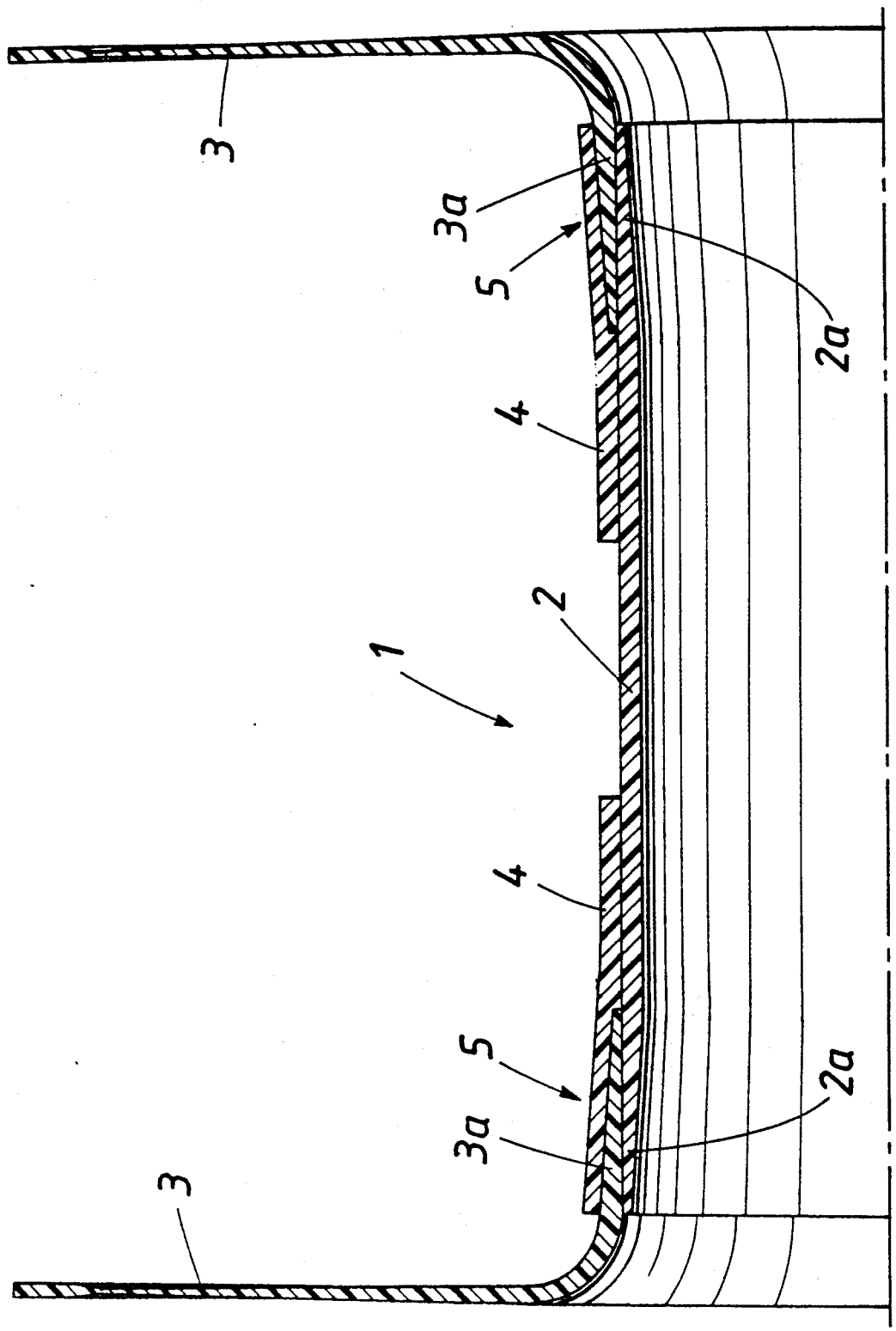

TORQUE-TRANSMITTING COUPLING MEMBER

BACKGROUND OF THE INVENTION

1. Field of the Invention

This invention relates to a coupling member for incorporation in a torque-transmitting drive train, which coupling member comprises a tube and at least one flange at at least one end of said tube, wherein said tube and flange consist of fiber-reinforced plastic.

2. Description of the Prior Art

Coupling members made of fiber-reinforced plastic have already proved satisfactory because when used to connect the two halves of a shaft coupling or as a shaft member in a drive train they will not only ensure a satisfactory transmission of torque owing to the special course of their reinforcing fibers but owing to the flexibility of their diaphragm-like flanges they can adapt themselves to axial relative movements of the moving members which are coupled. Beside, the plastic material of the coupling member provides for an effective sound insulation, by which a transmission of structure-borne sound is prevented. As is apparent from EP-A1-0 413 677 the tube and flange of the known coupling member constitute in integral fiber-reinforced plastic body and this involves a considerable manufacturing expenditure. Besides, it is not possible to achieve a perfect adaptation of the reinforcing fibers as regards their course, density and stratitication to the load conditions and adapting movements which are to be expected because the fibers extend continuously from the tube to the flanges so that the arrangement of the fibers in the flange and tube depend on each other to a certain degree.

SUMMARY OF THE INVENTION

For this reason it is an object of the invention to eliminate said disadvantages and to provide a coupling member which is of the kind described first hereinbefore and which can economically be manufactured and can well be adapted to different conditions of use as regards its transmitting and self-aligning properties.

That object is accomplished in accordance with the invention in that the tube and the flange or flanges are separately prefabricated and are adhesively joined to and by a sleeve. Because the coupling member is composed of a tube and at least one flange, which constitute separate parts, said parts may have a shape which permits of a simple manufacture and the fiber structures of each of said parts can substantially independently be selected to provide the desired flexibility and load-carrying capacity. The parts which have been individually prefabricated are adhesively joined in a proper position relative to each other and by an adhesive joint which has the required strength.

If the flange has a tubular extension, which extends between the tube and the sleeve, and the end portions of the tube and the wall thicknesses of the end portions of the tube and of the tubular extensions preferably taper in wall thickness in mutually opposite directions adjacent to the lap joint, the adhesive joints will extend around the tube and the conditions which determine the fixation of the flange to the members to be coupled and the freedom of movement of the flanges will not adversely be affected. A decrease of the wall thickness of a tapering and portion of the tube and a corresponding increase of the wall thickness of the tapering tubular extension will result in a design which is adapted to the distribution of the torque that is transmitted between the flange and the tube because the torque will increasingly be transmitted by the flange as the wall thickness of the tube decreases and vice versa.

BRIEF DESCRIPTION OF THE DRAWING

The drawing is an axial sectional view showing one half of an illustrative embodiment of a coupling member in accordance with the invention.

DETAILED DESCRIPTION OF THE PREFERRED EMBODIMENT

A torsionally stiff, flexible coupling member 1 comprises an intermediate tube 2 and two flanges 3, which adjoin the tube 2 at opposite ends. The tube 2 and the flanges 3 consist of fiber-reinforced plastic. To simplify the manufacture and to facilitate the selection of the properties of the tube and flanges in view of different conditions of the, the tube 2 and the flanges 3 are separately prefabricated and are adhesively joined to each other by means of a sleeve 4, which also consists of fiber-reinforced plastic. To that end, each flange 3 comprises a tubular extension 3a, which protrudes axially toward the tube 2 and extends between the sleeve 4 and the tube 2 and the flanges 3 are adhesively joined to the tube 2 directly and also indirectly by means of the sleeve 4 to provide a joint which has the required strength. At each lap joint 5 the tubular extension 3a and the end portion 2a of the tube are conical and their wall thicknesses decrease in mutually opposite directions so that in that region the wall thicknesses of the adhesively joined parts have approximately the same ratio as the torques to be transmitted by said portions.

I claim:

1. A torque-transmitting coupling member comprising
   (a) a tube having opposite ends,
   (b) a flange having an axial extending portion adjoining one of the tube ends,
      the tube and the flange consisting of two separate prefabricated parts of fiber-reinforced plastic and being arranged such that the axial extending portion overlaps the one tube end, and
   (c) a sleeve overlapping the axial extending potion and connecting the flange to the one tube end,
      the separate tube and the separate flange being adhesively joined to each other by said sleeve.

2. The torque-transmitting coupling member of claim 1, wherein the axial extending portion comprises a tubular extension projecting between the one tube end and the sleeve, the tubular extension having opposite sides respectively facing the tube and the sleeve, and the opposite sides of the tubular extension being adhesively joined to the tube and the sleeve, respectively.

3. The torque-transmitting coupling member of claim 2, wherein the tubular extension and the one tube end have wall thicknesses tapering in opposite axial directions.

4. The torque-transmitting coupling member of claim 1, further comprising a second flange adjoining the tube end opposite the one tube end, the second flange consisting of a separate prefabricated part of fiber-reinforced plastic and having an axial extending portion after "plastic", and a second sleeve overlapping the axial extending portion to connect the second flange to the opposite tube end, the tube and the separate second flange being adhesively joined to each other by said second sleeve.

* * * * *